United States Patent [19]

Magol et al.

[11] Patent Number: 4,880,450

[45] **Date of Patent: * Nov. 14, 1989**

[54] CYCLONE SEPARATOR HAVING WATER-STEAM COOLED WALLS

[75] Inventors: Byram J. Magol, Covent Station; John D. Fay, Randolph; Michael Garkawe, Madison, all of N.J.

[73] Assignee: Foster Wheeler Energy Corporation, Clinton, N.J.

[ * ] Notice: The portion of the term of this patent subsequent to May 24, 2005 has been disclaimed.

[21] Appl. No.: 161,632

[22] Filed: Feb. 29, 1988

Related U.S. Application Data

[63] Continuation-in-part of Ser. No. 69,930, Jul. 6, 1987, Pat. No. 4,746,337.

[51] Int. Cl.[4] .......... B01D 45/12

[52] U.S. Cl. .......... 55/269; 55/435

[58] Field of Search .......... 55/268, 269, 435

[56] References Cited

U.S. PATENT DOCUMENTS

| | | | |
|---|---|---|---|
| 1,890,170 | 7/1987 | Van Brunt | 122/235 A |
| 2,437,294 | 3/1948 | Dalin | 55/269 |
| 2,937,141 | 5/1960 | Helwig | 208/361 |
| 3,327,456 | 6/1967 | Guber, Jr. et al. | 55/269 |
| 3,470,678 | 10/1969 | Clark et al. | 55/269 |
| 3,732,920 | 5/1973 | Kimmel | 165/119 |
| 4,615,715 | 10/1986 | Seshamani | 55/269 |
| 4,746,337 | 5/1988 | Magol | 55/269 |

*Primary Examiner*—Bernard Nozick

*Attorney, Agent, or Firm*—Marvin A. Naigur; Warren B. Kice

[57] ABSTRACT

A cyclone separator in which an outer cylinder is formed by a plurality of vertically-extending, spaced, parallel tubes and extends around an inner pipe in a coaxial relationship therewith to define an annular chamber. A portion of the tubes forming the outer cylinder are bent out of the plane of the cylinder to form an inlet opening in a tangential relationship to the annular chamber for receiving gases containing solid particles and directing same through the annular chamber for separating the solid particles from the gas by centrifugal forces. The tubes are bent to form a roof for the annular chamber and to form a discharge chamber for the separated gases.

6 Claims, 2 Drawing Sheets

CYCLONE SEPARATOR HAVING WATER-STEAM COOLED WALLS

CROSS-REFERENCE TO RELATED APPLICATION

This application is a continuation-in-part of Applicant's co-pending application Ser. No. 069,930 filed July 6, 1987, now U.S. Pat. No. 4,746,337.

BACKGROUND OF THE INVENTION

This invention relates to a cyclone separator and, more particularly, to such a separator for separating solid fuel particles from gases discharged from a combustion system or the like.

Conventional cyclone separators are normally provided with a monolithic external refractory wall which is abrasion resistant and insulative so that the outer casing runs relatively cool. Typically, these walls are formed by an insulative refractory material sandwiched between an inner hard refractory material and an outer metal casing. In order to achieve proper insulation, these layers must be relatively thick which adds to the bulk, weight, and cost of the separator. Also, the outside metal casing of these designs cannot be further insulated from the outside since to do so could raise its temperature as high as 1500° F. which is far in excess of the maximum temperature it can tolerate.

Further, most conventional cyclone separators require relatively expensive, high temperature, refractory-lined ductwork and expansion joints between the reactor and the cyclone, and between the cyclone and the heat recovery section, which are fairly sophisticated and expensive. Still further, conventional separators formed in the above manner require a relatively long time to heat up before going online to eliminate premature cracking of the refractory walls, which is inconvenient and adds to the cost of the process. Also, cyclone separators of this type may require a separate roof tube circuit which still further adds to the cost of the system.

SUMMARY OF THE INVENTION

It is therefore an objective of the present invention to provide a cyclone separator in which heat losses are reduced and the requirement for internal refractory insulation is minimized.

It is a still further object of the present invention to provide a cyclone separator of the above type in which the bulk, weight and cost of the separator are much less than that of conventional separators.

It is a still further object of the present invention to provide a cyclone separator of the above type in which the need for expensive, high-temperature, refractory-lined ductwork and expansion joints between the furnace and the cyclone separator and between the latter and the heat recovery section are minimized.

It is a still further object of the present invention to provide a cyclone separator of the above type in which the need for a separate roof-type circuit is eliminated.

Toward the fulfillment of these and other objects, the separator of the present invention includes an outer cylinder and an inner pipe disposed in a coaxial, spaced relationship to define an annular chamber for receiving gases having solid particles entrained therein. The outer cylinder comprises a plurality of tubes extending vertically in a parallel relationship for at least a portion of their lengths, and a header is provided at the end of the cylinder formed by the tubes to pass cooling water or steam through the tubes. A portion of the tubes are bent from the plane of the outer cylinder to form an inlet opening in a tangential relationship to the annular chamber for receiving the gases containing the solid particles. The mixture of gases and solid particles are directed through the annular chamber for separating the solid particles from the gases by centrifugal forces, whereby the solid particles fall to the lower portion of the outer cylinder for disposal or recycle, and the gases pass upwardly through the inner pipe. The tubes forming the outer cylinder are bent to form a roof for the annular chamber and an outlet chamber for the separated gases.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
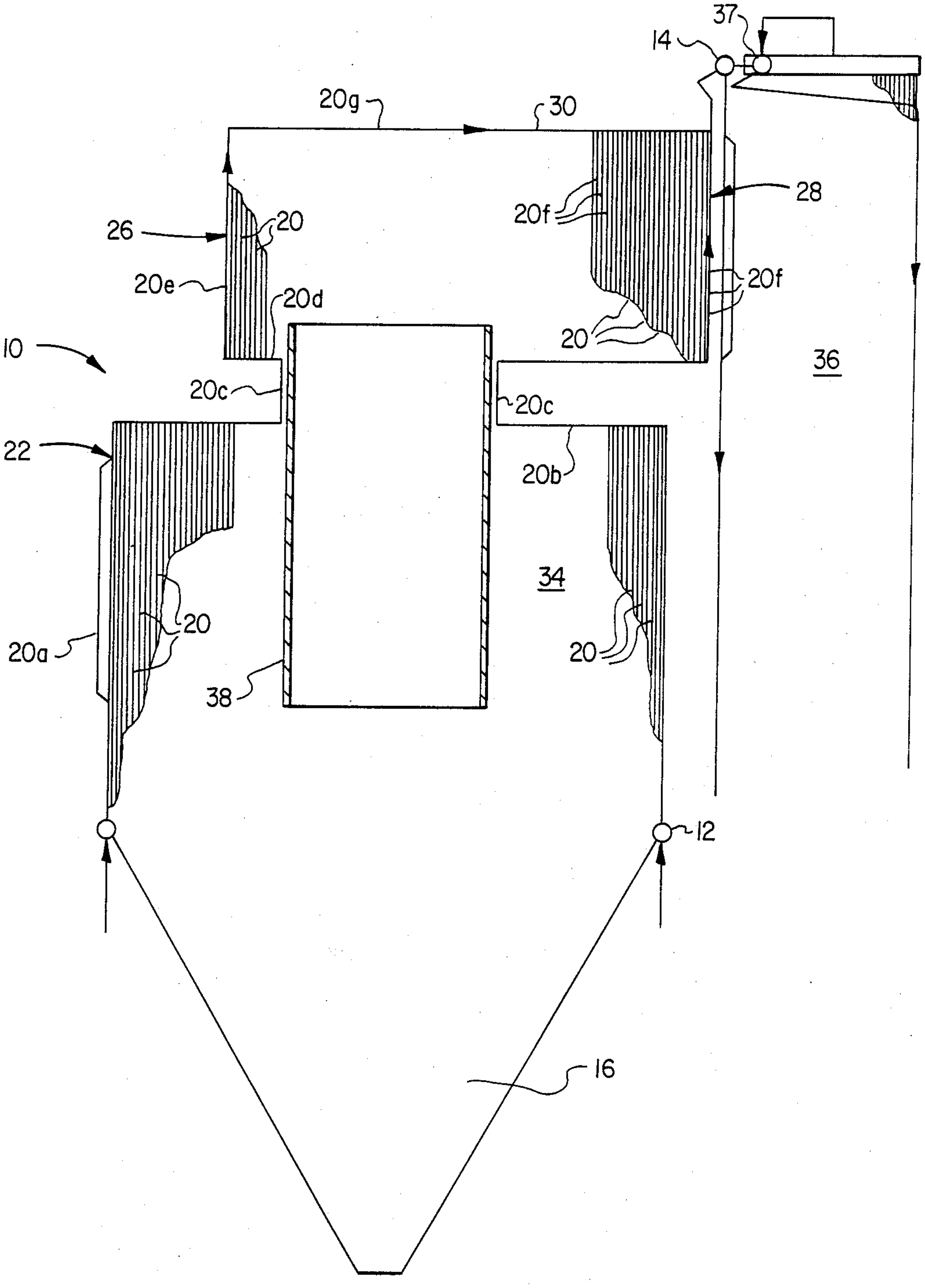
FIG. 1 is a schematic view of the cyclone separator of the present invention and an adjacent heat recovery area of a boiler system.
Figure 2:
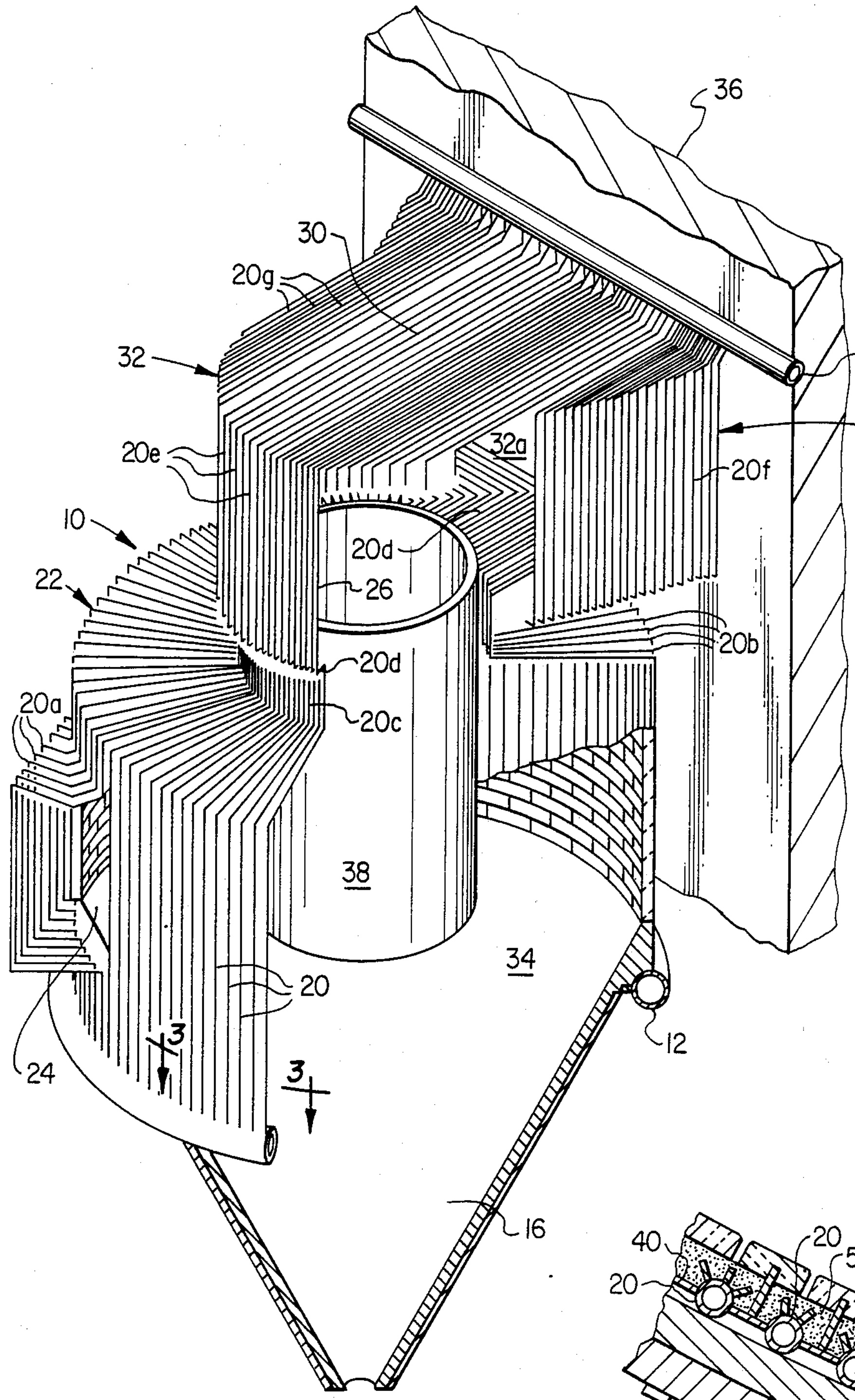
FIG. 2 is an enlarged perspective view of the tubes forming the outer cylinder of the separator of FIG. 1.

Referring to FIGS. 1 & 2 of the drawings, the reference numeral 10 refers in general to the cyclone separator of the present invention which includes a lower ring header 12 and an upper header 14. The header 12 extends immediately above, and is connected to, a hopper 16 disposed at the lower portion of the separator 10.

A group of vertically-extending, spaced, parallel tubes 20 are connected at their lower ends to the header 12 and extend vertically for the greater parts of their lengths to form a right circular cylinder 22.

A portion of the tubes 20 are bent out of the plane of the cylinder 22, as shown by the reference numerals **20*a*, and, as shown in FIG. 2, approximately half of these bent tube portions are bent away from the other half to form an inlet passage 24** to the interior of the cylinder for reasons that will be described.

At the upper end of the cylinder 22 the tubes 20 are bent radially inwardly, as shown by the reference numeral **20*b*, and then upwardly as shown by the reference numeral 20*c*, to define a circular opening which, of course, is of a diameter less than that of the diameter of the cylinder 22. The tubes 20 are then bent radially outwardly as shown by the reference numeral 20*d*, and a portion of these bent tube portions 20*d* are bent upwardly as shown by the reference numeral 20*e*. As better shown in FIG. 2 the bent tube portions 20*e* form approximately one-half of a right circular cylinder 26. The remaining portions of the bent tube portions 20*d* extend horizontally, are bent at right angles in a horizontal plane, and then vertically, as shown by the reference numeral 20*f***, to form two vertically extending, spaced walls one of which is shown by the reference numeral 28. The tube portions 20e and the vertically extending tube portions 20f are bent to form horizontal tube portions 20g which form a roof 30 for an enclosure 32 defined by the tube portions 20d, the partial cylinder 26 and the walls 28.

The enclosure 32 has an outlet opening 32a which discharges to a heat recovery area, shown in general by the reference numeral 36.

The lower header 12 can be connected to a source of cooling fluid, such as water which passes from the header 12, through the tubes 20, and into the upper header 14 which is connected to a header 37 forming a portion of the water flow circuitry of the heat recovery area 36.

An inner pipe, or barrel, 38 is disposed within the cylinder 22, is formed from a solid, metallic material, such as stainless steel, and has an upper end portion extending slightly above the plane of the tube portions 20d. The pipe 38 extends immediately adjacent the tube portions 20c, and its length substantially coincides with the inlet passage formed by the bent tube portions 20a. Thus, an annular chamber 34 is formed between the outer surface of the pipe 38 and the inner surface of the cylinder 22, and the tube portions 20b form a roof for said chamber.

Figure 3:
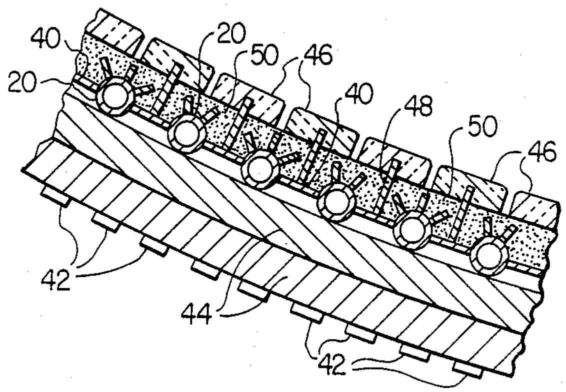
FIG. 3 is an enlarged, cross-sectional view taken along the portion of the wall of the outer cylinder of FIG. 3 designated by the line 3—3, and showing the insulative materials surrounding the tubes.

The tubes 20 are disposed between an insulative material and an erosion preventing structure which are omitted from FIG. 2 for the convenience of presentation but which are shown in FIG. 3. More particularly, a fin 40 is welded to, and extends from, the corresponding walls of each pair of adjacent tubes 20. A lagging, or panel 42 of a lightweight material, such as aluminum, is provided in a slightly spaced relationship to the plane of the tubes 20, and a heat insulative material 44 is disposed between the outer surface of the tubes 20 and the inner wall of the lagging 42. A plurality of tiles 46 extend adjacent the inner wall of the cylinder 22 and are connected to anchors 48 extending from the inner walls of the fins 40. A layer of refractory material 50 is disposed between the tiles 46 and the tubes 20.

In operation, and assuming the separator 10 of the present invention is part of a boiler system including a fluidized bed reactor, or the like, disposed adjacent to the separator, the inlet passage 24 formed by the bent tube portions 20a receives hot gases from the reactor which gases contain entrained fine solid particulate fuel, ash, limestone, etc. from the fluidized bed. The gases containing the particulate material thus enter and swirl around in the annular chamber 34 defined between the cylinder 22 and the inner pipe 38, and the entrained solid particles are propelled by centrifugal forces against the inner wall of the cylinder 22 where they collect and fall downwardly by gravity into the hopper 16. The relatively clean gases remaining in the annular chamber 34 are prevented from flowing upwardly by the roof formed by the tube portions 20b and their corresponding fins 40, and thus enter the pipe 38 through its lower end. The gases thus pass through the length of the pipe 38 before exiting from the upper end of the pipe to the enclosure 32 which directs the hot gases radially outwardly to the heat recovery area 36.

Water or steam from an external source is passed into the lower header 12 and passes upwardly through the tubes 20 before exiting, via the upper header 14 to the header 37 of the heat recovery area 36. The water thus maintains the cylinder 22 and the enclosure 32 at a relatively low temperature.

Several advantages result from the foregoing arrangement. For example, the separator of the present invention reduces heat losses and minimizes the requirement for internal refractory insulation. Also, the bulk, weight, and cost of the separator of the present invention is much less than that of conventional separators. The separator of the present invention also minimizes the need for expensive high temperature refractory-lined ductwork and expansion joints between the reactor and cyclone separator, and between the latter and the heat recovery section. Still further, by utilizing the tube portions 20b to form a roof for the annular chamber 34 between the cylinder 22 and the pipe 38, the requirement for additional roof circuitry is eliminated.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention therein.

What is claimed is:

1. A cyclone separator comprising an inner cylinder, an outer cylinder extending around said inner cylinder in a coaxial relationship to define an annular chamber between the two cylinders, said outer cylinder comprising a plurality of tubes extending vertically and circumferentially in a parallel relationship for at least a portion of their lengths, a first ring header connected to the upper ends of said tubes and a second ring header connected to the lower ends of said tubes for circulating a cooling fluid through said outer cylinder, means for directing gases containing solid particles through said annular chamber for separating the solid particles form said gases by centrifugal forces, the separated gases exiting through said inner cylinder and the separated solids falling to the bottom of said outer cylinder for disposal or recycle, the upper end portions of said tubes being bent radially inwardly towards said inner cylinder and radially outwardly to form a roof for said annular chamber, and means for passing water or steam or a steam and water mixture through said ring headers and said tubes to cool said outer cylinder.

2. The separator of claim 1 wherein said tubes are disposed in a spaced relationship.

3. The separator of claim 2 further comprises a continuous fin extending from corresponding portions of adjacent tubes to form a gas tight structure.

4. The separator of claim 1 further comprising refractory means extending around the inner and outer surfaces of said outer cylinder.

5. The separator of claim 1 wherein said directing means is formed by a portion of said tubes bent from the plane of the outer cylinder to form an inlet opening for receiving said gases.

6. The separator of claim 5 wherein portions of said bent tube portions extend from said inner cylinder to the wall of said outer cylinder to form said roof.

* * * * *

UNITED STATES PATENT AND TRADEMARK OFFICE
CERTIFICATE OF CORRECTION

PATENT NO. : 4,880,450

DATED : November 14, 1989

INVENTOR(S) : Bryam J. Magol

It is certified that error appears in the above-identified patent and that said Letters Patent is hereby corrected as shown below:

In the Claims:

1. A cyclone separator comprising an inner cylinder, an outer cylinder extending around said inner cylinder in a coaxial relationship to define an annular chamber between the two cylinders, said outer cylinder comprising a plurality of tubes extending vertically and circumferentially in a parallel relationship for at least a portion of their lengths, a [first ring header connected to the upper ends of said tubes and a second] ring header connected to the lower ends of said tubes for [circulating a] supplying cooling fluid [through] to said [outer cylinder] tubes, a hopper extending downwardly from said ring header, means for directing gases containing solid particles through said annular chamber for separating the solids particles from said gases by centrifugal forces, the separated gases exiting through said inner cylinder and the separated solids falling to [the bottom of said outer cylinder for disposal or recycle] said hopper, the upper end portions of said tubes being bent [radially inwardly towards said inner cylinder and radially outwardly] to form a roof for said annular chamber and to form an outlet chamber for the separated gases, and means for passing water or steam or a steam and water mixture through said [ring headers and said] tubes to cool said outer cylinder.

Signed and Sealed this

Eleventh Day of September, 1990

*Attest:*

HARRY F. MANBECK, JR.

*Attesting Officer* *Commissioner of Patents and Trademarks*

US004880450B1
REEXAMINATION CERTIFICATE (1765th)
United States Patent [19]
[11] B1 4,880,450
Magol et al.
[45] Certificate Issued * Aug. 4, 1992

[54] CYCLONE SEPARATOR HAVING WATER-STEAM COOLED WALLS

[75] Inventors: Byram J. Magol, Covent Station; John D. Fay, Randolph; Michael Garkawe, Madison, all of N.J.

[73] Assignee: Foster Wheeler Energy Corporation, Clinton, N.J.

Reexamination Request:
No. 90/002,427, Sep. 3, 1991

Reexamination Certificate for:
Patent No.: 4,880,450
Issued: Nov. 14, 1989
Appl. No.: 161,632
Filed: Feb. 29, 1988

[ * ] Notice: The portion of the term of this patent subsequent to May 24, 2005 has been disclaimed.

Certificate of Correction issued Sep. 11, 1990.

Related U.S. Application Data

[63] Continuation-in-part of Ser. No. 69,930, Jul. 6, 1987, Pat. No. 4,746,337.

[51] Int. Cl.[5] .......... B01D 45/12
[52] U.S. Cl. .......... 55/269; 55/435
[58] Field of Search .......... 55/268, 269, 435; 165/119

[56] References Cited

U.S. PATENT DOCUMENTS

| | | | |
|---|---|---|---|
| 1,890,170 | 12/1932 | Van Brunt | 122/235 A |
| 2,437,294 | 3/1948 | Dalin | 55/269 |
| 2,937,141 | 5/1960 | Helwig | 208/361 |
| 3,327,456 | 6/1967 | Gruber et al. | 55/269 |
| 3,470,678 | 10/1969 | Clark et al. | 55/269 |
| 3,732,920 | 5/1973 | Kimmel et al. | 165/119 |
| 4,615,715 | 10/1986 | Seshamani | 55/269 |
| 4,746,337 | 5/1988 | Magol et al. | 55/269 |
| 4,913,711 | 4/1990 | Stewart | 55/269 |

FOREIGN PATENT DOCUMENTS

| | | |
|---|---|---|
| 2527478 | 12/1983 | France . |
| 54-91602 | 7/1979 | Japan . |
| 57-35857 | 2/1982 | Japan . |
| 437124 | 2/1985 | Sweden . |
| 709182 | 1/1980 | U.S.S.R. . |
| 567450 | 2/1945 | United Kingdom . |
| 587240 | 4/1947 | United Kingdom . |
| 641357 | 8/1950 | United Kingdom . |

*Primary Examiner*—Bernard Nozick

[57] ABSTRACT

A cyclone separator in which an outer cylinder is formed by a plurality of vertically-extending, spaced, parallel tubes and extends around an inner pipe in a coaxial relationship therewith to define an annular chamber. A portion of the tubes forming the outer cylinder are bent out of the plane of the cylinder to form an inlet opening in a tangential relationship to the annular chamber for receiving gases containing solid particles and directing same through the annular chamber for separating the solid particles from the gas by centrifugal forces. The tubes are bent to form a roof for the annular chamber and to form a discharge chamber for the separated gases.

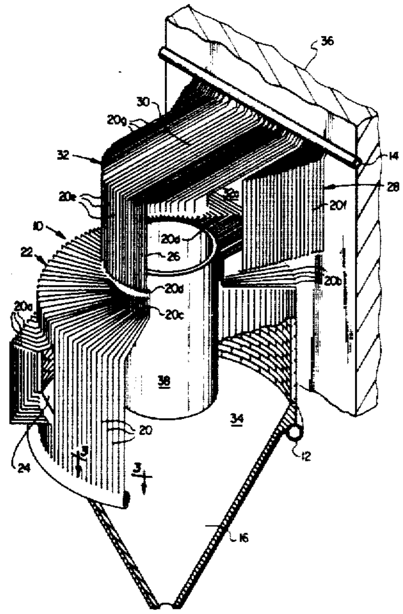

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION IT HAS BEEN DETERMINED THAT:

Claims 1 and 3 are cancelled.

Claims 2, 4, and 5 are determined to be patentable as amended.

Claim 6 dependent on an amended claim, is determined to be patentable.

New claims 7-11 are added and determined to be patentable.

2. The separator of claim [1] *8 or 9* wherein said tubes are disposed in a spaced relationship.

4. The separator of claim [1] *8 or 9* further comprising refractory means extending around the inner and outer surfaces of said outer cylinder.

5. The separator of claim [1] *8 or 9* wherein said directing means is formed by a portion of said tubes bent from the plane of the outer cylinder to form an inlet opening for receiving said gases.

*7. The separator of claim 1 wherein said outlet chanber has a floor and wherein said inner cylinder is disposed so that an upper portion of said inner cylinder extends above a plane formed by said floor of said outlet chamber.*

*8. The separator of claim 1 further comprising a continuous fin extending between adjacent tubes, a plurality of tiles extending adjacent an inner wall of said outer cylinder, means connecting said tiles to said fins, and refractory disposed between said fins and said tiles.*

*9. The separator of claim 1 further comprising a continuous fin extending from corresponding portions of adjacent tubes to form a gas tight structure.*

*10. The separator of claim 8 or 9 wherein said outlet chamber has a floor and wherein said inner cylinder is disposed so that an upper portion of said inner cylinder extends above a plane formed by said floor of said outlet chamber.*

*11. The separator of claim 1 or 8 or 9 wherein each of said bent upper end portions of said tubes include a horizontal portion extending from said outer cylinder to said inner cylinder, a vertical portion engaging a corresponding portion of said inner cylinder along the length of said vertical portion, and another horizontal portion extending outwardly from said inner cylinder to form a floor of said outlet chamber.*

* * * * *